United States Patent [19]
Lukens, Jr.

[11] 3,993,284
[45] Nov. 23, 1976

[54] CONNECTION OF ACTUATOR CYLINDER HOUSING TO VALVE BONNET

[75] Inventor: Floyd W. Lukens, Jr., Alvin, Tex.

[73] Assignee: ACF Industries, Incorporated, New York, N.Y.

[22] Filed: June 26, 1975

[21] Appl. No.: 590,530

[52] U.S. Cl. ............................. 251/63.6; 251/214; 92/128; 137/315
[51] Int. Cl.² ................................. F16K 31/363
[58] Field of Search ................. 92/128; 251/62, 63, 251/63.4, 63.5, 63.6, 326, 214; 137/315

[56] References Cited
UNITED STATES PATENTS

| | | | |
|---|---|---|---|
| 3,378,224 | 4/1968 | Boyle | 251/63.6 |
| 3,385,561 | 5/1968 | Whalen | 251/14 |
| 3,765,642 | 10/1973 | Nelson | 251/14 |
| 3,789,875 | 2/1974 | McGee | 251/63.6 |
| 3,842,854 | 10/1974 | Wicke | 251/14 |
| 3,889,922 | 6/1975 | Peters | 251/63.6 |

FOREIGN PATENTS OR APPLICATIONS 824,810  12/1959  United Kingdom.................. 251/14

Primary Examiner—Martin P. Schwadron
Assistant Examiner—G. L. Walton
Attorney, Agent, or Firm—Eugene N. Riddle

[57] ABSTRACT

A mount for securing an actuator cylinder on a gate valve, wherein the valve has a stem extending through a sleeve on the valve bonnet and the actuator cylinder has a collar mounted on the sleeve. The actuator cylinder is mounted such that it will not rotate on the sleeve. A split ring is mounted in a groove in the outer end portion of the sleeve at the collar. A means mounted on the sleeve extends over the split ring to detain it in mounted position.

6 Claims, 3 Drawing Figures

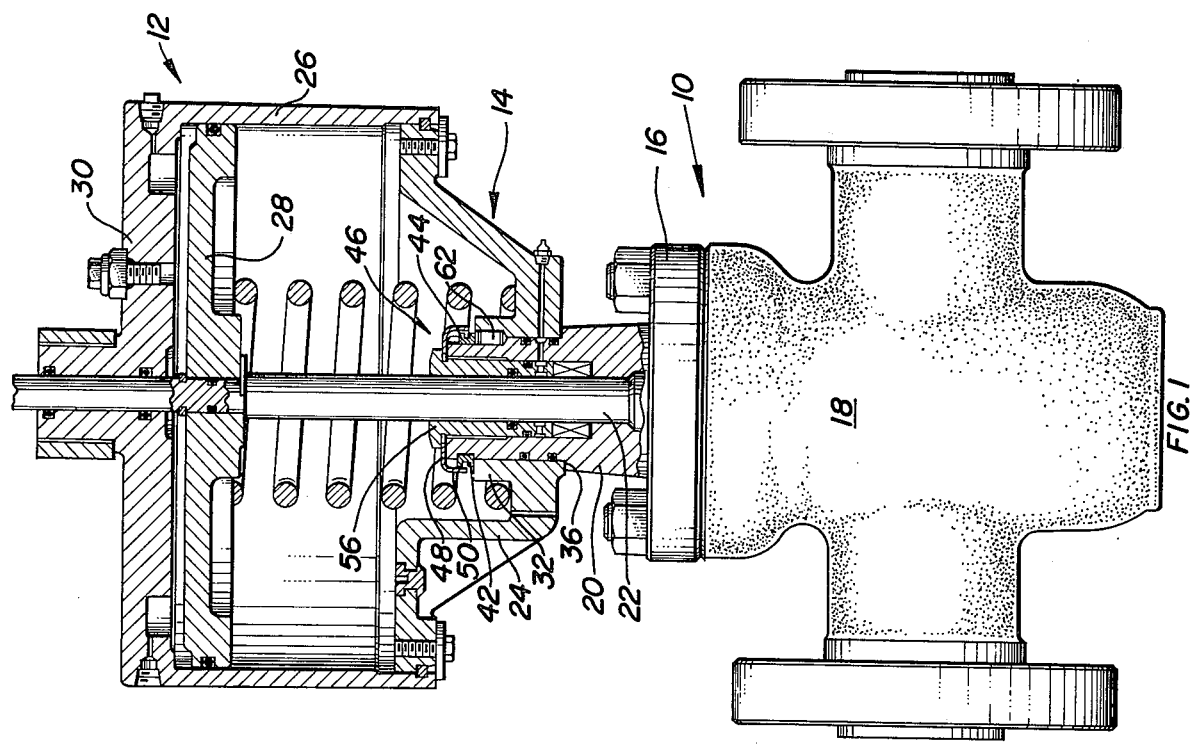
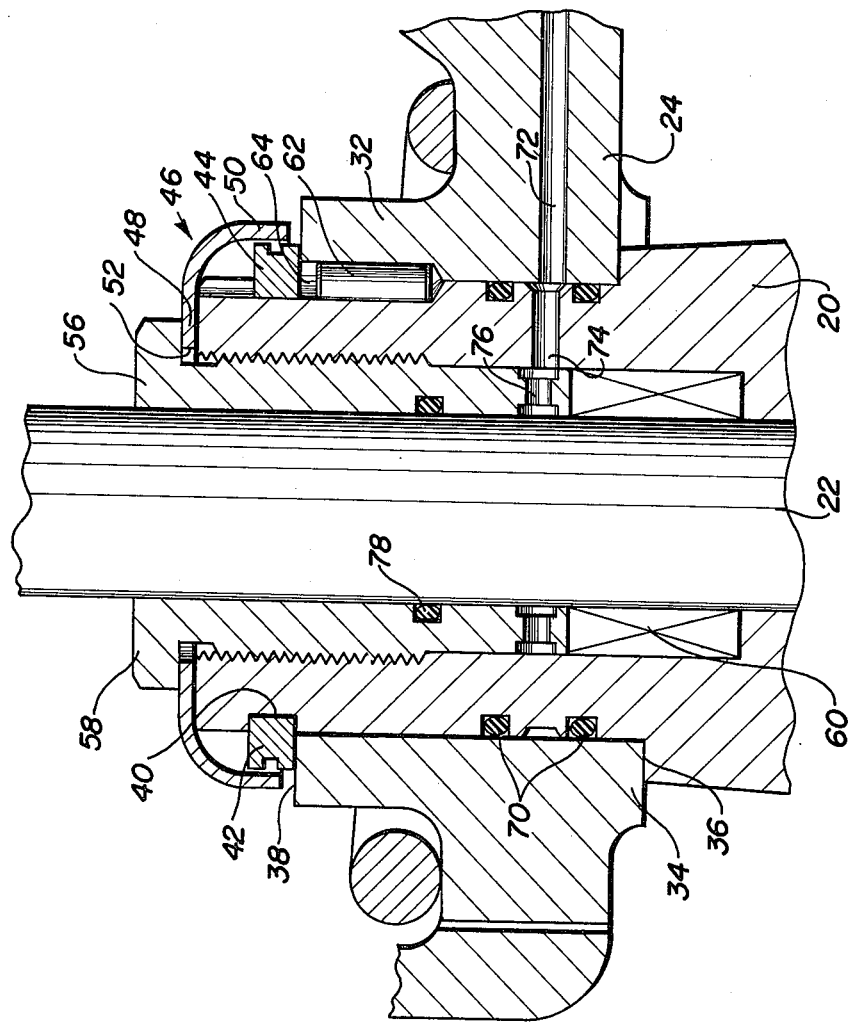

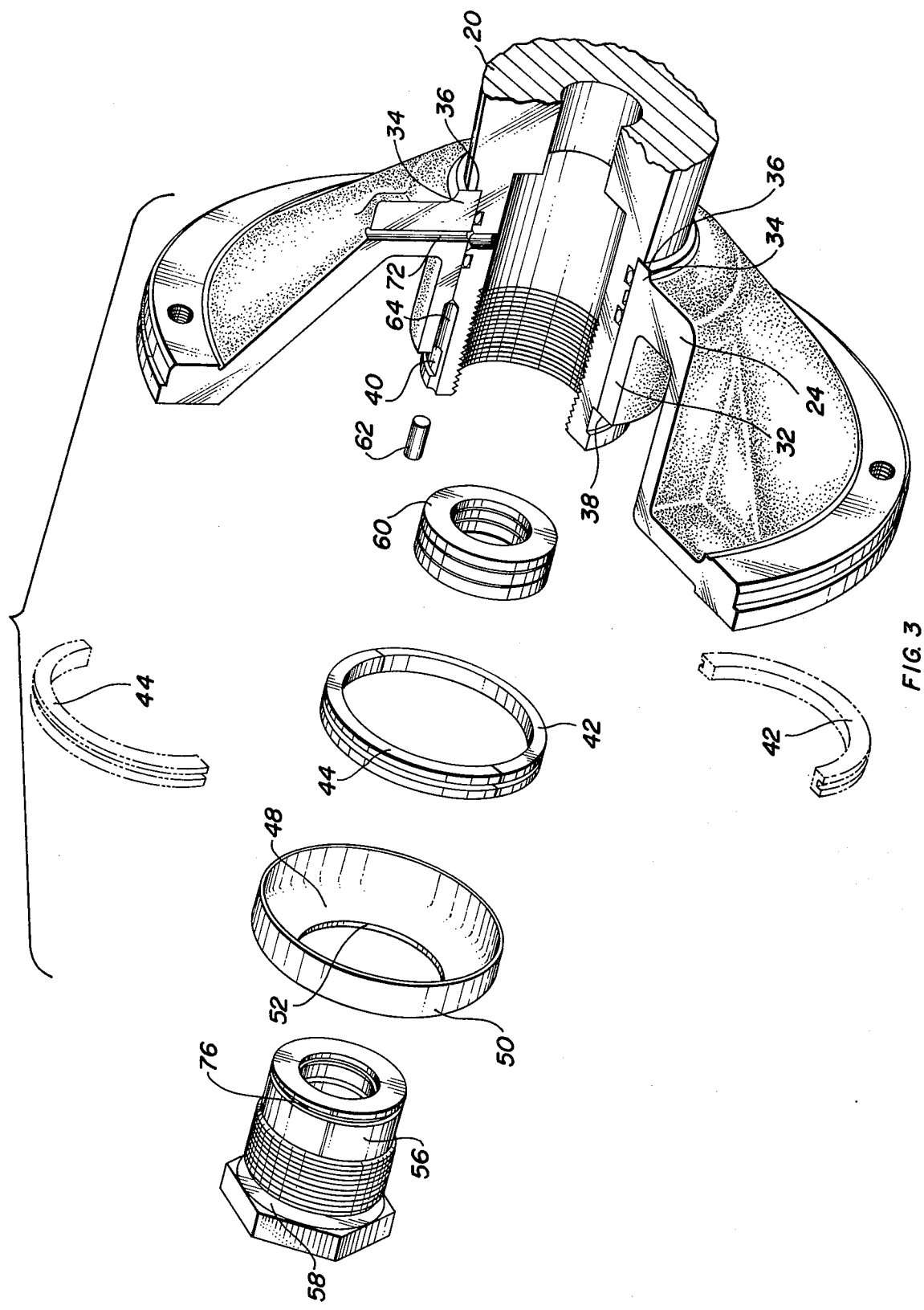

3,993,284

CONNECTION OF ACTUATOR CYLINDER HOUSING TO VALVE BONNET

BACKGROUND OF THE INVENTION

This invention is related to mounting structures for securing a fluid actuator housing on to the bonnet of a valve. More particularly, this invention is related to the mounting of a pneumatic actuator housing on a sleeve around the stem of a gate valve wherein the mounting structure includes a split ring engaged with the sleeve and secured in place by a retainer.

Several devices are known in the prior art for mounting pneumatic actuator cylinders on gate valves, however, each has certain undesirable characteristics. One such structure for mounting a pneumatic actuator includes a sleeve around the valve stem extending from the bonnet whereupon a collar extending from a center portion of the actuator is mounted. The collar and the sleeve are secured by a set screw that extends through the collar and contacts or extends into a portion of the sleeve. While this mounting arrangement does secure the actuator to the valve bonnets, it requires the set screw to be tight in order to adequately secure the actuator, and provides no mounting support should the set screw become loosened or should it otherwise fail. Another mounting arrangement has a sleeve on the bonnet around the stem with a collar on the actuator housing being slidably mounted on the sleeve. A locking ring is mounted in the exterior of the outer end portion of the sleeve and retained within the inner end of portion of the collar. In this structure the actuator must be first placed over the sleeve then the locking ring inserted, next the actuator is raised or moved outward on the sleeve so the innermost portion thereof surrounds the locking ring. A second locking ring must then be engaged in a groove in the sleeve at the exterior end of the collar to retain the actuator in position on the sleeve. This construction has the inherent disadvantage in that once the actuator is installed, only the second described locking ring holds it in position on the sleeve. An additional disadvantage is that because the locking ring and the portion of the sleeve between the actuator and the bonnet are exposed, weather, paint and rust can damage the exterior of the surfaces of these parts making it extremely difficult to disassemble the actuator for service or replacement after it has been in service for a period of time.

SUMMARY OF THE INVENTION

This invention is directed to a mounting structure for securing a pneumatic actuator on the bonnet of a valve. The invention is directed to a valve, such as a gate valve, wherein the valve stem extends through the bonnet and a sleeve is provided on the bonnet around a portion of the stem. The pneumatic actuator has a cylinder housing with a central opening through one end thereof and a collar is rigidly mounted through the opening. The collar is mounted on the bonnet over the sleeve. The bonnet has means to rigidly support the exposed end of the collar. The outermost end of the sleeve extends into the cavity of the cylinder housing and slightly beyond the collar. The sleeve is provided with a groove around its exterior to receive and mount a split ring. The mounting structure of this invention has means mounted with the sleeve which extends over a peripheral portion of the split ring to retain it in its mounted position. In a structural embodiment the means to retain the split ring is a one-piece retainer member having an aperture through a center portion thereof and having a radial portion extending around the perimeter of the split ring. An abutment on the sleeve near the bonnet limits motion of the cylinder housing in the direction of the bonnet and provides a rest. A key like member mounted with the collar and with the sleeve prevents rotation of the cylinder housing relative to the sleeve and the bonnet.

DESCRIPTION OF THE DRAWINGS

FIG. 1 is a side elevation view of a valve having a pneumatic actuator mounted on the bonnet and secured by the mounting structure of this invention. Portions of the actuator housing and the valve bonnet are shown cut away for clarity;

FIG. 2 is an enlarged fragmentary cut-away elevation view of the juncture of the valve bonnet sleeve and the actuator cylinder housing; and FIG. 3 is an exploded perspective view of the bottom portion of the actuator housing and the outer portion of the bonnet sleeve with portions of the housing bottom and sleeve cut away for clarity.

The following is a discussion and description of specific embodiments of the mounting structure of this invention, such being made with reference to the drawings, whereupon the same referenced numerals are used to indicate the same or similar parts and/or structure. It is to be understood that such discussion and description is not to unduly limit the scope of the invention.

DETAILED DESCRIPTION

Referring to the drawings in detail and in particular to FIG. 1, a valve, indicated generally at 10, is shown with a pneumatic actuator, indicated generally at 12, mounted on the valve's bonnet and secured by the mounting structure of this invention, indicated generally at 14. Valve 10 can be a gate valve or any other valve wherein longitudinal motion of the valve's stem opens and closes the valve. In practice this mount structure has been successfully used with a gate valve that is in closed position when the stem is in an extended position. Valve 10 has its bonnet 16 mounted on top of the valve's body 18 and secured by bolts. Valve bonnet 16 has a sleeve 20 integrally formed therewith which is hollow and has the valve stem 22 mounted therethrough as shown in FIG. 1. Pneumatic actuator 12 has a cylinder housing bottom end member 24 that has a centrally located opening therethrough. This central opening in cylinder bottom 24 is used for mounting it on bonnet sleeve 20. Pneumatic actuator 12 has a cylinder housing side wall 26 around a piston 28. The actuator housing opposite end 30 is secured to side wall 26. Valve stem 22 extends through pneumatic actuator 12 as shown in FIG. 1 where it is visible above housing end 30. Actuator housing bottom end member 24 has an integrally formed collar portion 32 through its central opening.

Actuator housing bottom end member 24 has a collar 32 integrally formed therewith through its central opening as shown in FIG. 2. Collar 32 has an inner portion extending inward inside the cavity of the actuator housing and it has an outer portion 34 extending from the exposed exterior of housing end member 24. Sleeve 20 has an annular abutment 36 or shoulder which contacts the outer end of collar outer end portion 34. The interior of collar 32 is preferably cross-sectionally round and also the exterior of sleeve 20 beyond abutment 36 is also preferably cross-sectionally round. It is to be understood that the sleeve and the collar can have a shape other than round. However, the round shape is preferred for ease in manufacture and assembly. Sleeve 20 extends into the cavity of the actuator housing beyond the inner end 38 of collar 32 a substantial distance as shown. The innermost end portion of sleeve 20 has a groove 40 around its perimeter at a point adjacent the juncture of sleeve 20 and collar end 38. A split ring having two segments 42 and 44 is mounted with its inside portion in groove 40 and its perimeter extended outwardly over a substantial portion of collar end 38. The split ring when in place prevents movement of collar 32 toward the end of sleeve 20. Groove 40 is located at collar end 38 when the collar 32 is resting on abutment 36 so that actuator housing bottom 24 is held in a substantially fixed position when the split ring is installed.

A retainer assembly indicated generally at 46 retains the split ring in its mounted position in groove 40. Retainer assembly 46 includes a cap-like retainer member having a radially disposed portion 48 and a cylindrical portion 50 forming an outer peripheral flange extending downwardly alongside the outer perimeter of the split ring. Radial portion 48 has an opening or aperture 52 through a center portion thereof which is positioned around the hollow portion of sleeve 20 at its end. Preferably, the retainer member is a one-piece cap-like member having aperture 52 through the flat or radially disposed portion thereof substantially as shown.

Retainer assembly 46 is secured to sleeve 20 by a packing retainer 56. Packing retainer is threadedly engaged in the interior of sleeve 20 and it has a radial portion or outer flange 58 extending outward over the exposed end of sleeve 20. Radial portion 58 has a series of flats on its exterior for tightening it like a nut or bolt. Packing retainer 56 secures stem packing 60 in sleeve 20 around stem 22. Outer flange 58 overlaps retainer aperture 52 and the adjacent portion of radial portion 48 to hold retainer 46 in position against the end of sleeve 20. Packing retainer 56 is tightened to firmly and rigidly hold retainer 46 in place. This also compresses stem packing 60 to assure good sealing between and around stem 22. In order to prevent rotation of the actuator housing on stem 20, a locking structure is provided to secure sleeve 20 to housing bottom 24. This structural connection has a pin 62 mounted in a bore 64 which is partially in the exterior portion of sleeve 20 and partially in the interior portion of collar 32. Bore 64 is elongated and longitudinally aligned with the axis of valve stem 22 and open at the juncture of collar 32 and sleeve 20 at collar end 38. Pin 62 is sized in bore 64 to be a loose fit so it can be easily slid in and out as needed for assembly and disassembly. Pin 62 must necessarily not extend beyond collar end 38 otherwise it would interfere with the split ring. Pin 62 prevents rotation of the actuator housing on sleeve 20 which is important and necessary to prevent packing retainer 56 from being unscrewed and to prevent rotating forces from being exerted on piston 28.

By preventing rotation of pneumatic actuator 12 it prevents up and down motion of the piston 28 from having any rotating effect on the actuator housing and allows collar 32 to be effectively sealed with sleeve 20 by an O-ring 70 placed in grooves in sleeve 20 as shown in FIG. 2. A passageway from the exterior of housing bottom member 24 to valve stem 22 is provided so that an emergency sealing compound can be injected around valve stem 22 if necessary. A portion of this passageway is through the housing bottom member 24 as indicated at 72. Another portion of this passageway is through sleeve 20 as indicated at 74 and a final end portion of this passageway is in packing retainer 56 around stem 22 as indicated at 76. For sealing valve stem 22 in packing retainer 56 an O-ring 78 is provided in a groove inside packing retainer 56.

In assembly of valve actuator 12 and mounting it on gate valve 10 the novel mounting structure of this invention simplifies the installation. In assembly of actuator 12 on valve 10, the actuator bottom member 24 is placed over sleeve 20 with sleeve 20 sliding into collar 32. The outer end portion 34 of collar 32 is placed in resting position on abutment 36 then actuator bottom member 24 is rotated so the separate portions of bore 64 are aligned and pin 62 is inserted. Split ring segments 42 and 44 are then assembled in groove 40 and retainer member 46 is placed on the exposed end of sleeve 20 and secured by packing retainer 56. Once packing retainer 56 is tightened, actuator housing bottom end member 24 is mounted and the remainder of actuator assembly can be installed. The disassembly of the mounting structure procedure is essentially reversed from that described above. It is to be noted that because retainer assembly 46, the split ring and alignment pin 62 are enclosed within the cavity of the actuator housing, these parts are protected from the weather and external damage. By protecting these parts it prevents deterioration and makes disassembly easier when it is necessary.

In manufacture of the mounting structure of this invention, it is obvious that it can be constructed by using the standard manufacturing techniques because no particularly complicated parts are required. Because of the simple nature of this mounting structure, abutment 36 can be easily formed on sleeve 20 and so can groove 40. The retainer assembly can be easily stamped or otherwise formed and sized to be used with a conventional style packing retainer. Bore 64 can be drilled to accept a pin cut from standard size material.

As will become apparent from the foregoing description of the applicant's mounting structure for securing a pneumatic actuator on a gate valve, the device provides a relatively simple, essentially trouble-free and easily constructed mounting structure. The mounting structure is easily adaptable to gate valves and any other valves which have a stem partially enclosed in a sleeve or the like. The mounting structure is economical to manufacture because of its simple nature and it is protected from the elements and it is less susceptible to physical damage by virtue of its being essentially enclosed inside the pneumatic actuator housing.

What is claimed is:

1. In a gate valve and fluid actuator therefor having a longitudinal movable valve stem extending through a valve bonnet and a fluid actuator cylinder housing mounted on said bonnet, an improved means to mount said actuator cylinder housing comprising:
   a. a sleeve extending from said bonnet around said stem,
   b. a central opening through said cylinder housing having a collar mounted in said cylinder housing at said opening, said collar being mounted on said sleeve, said bonnet having a means to receive and rigidly support one end of said collar, and said sleeve having an outer end portion extending substantially beyond said collar, c. means mounted on said sleeve and on said collar to prevent rotation of said cylinder housing relative to said bonnet, d. a groove around the exterior of said sleeve outer end portion, e. a split ring mounted in said groove, said split ring being positioned adjacent to the end of said collar, and f. ring retainer means rigidly mounted on said sleeve at a position above the ring and extending downwardly alongside an outer peripheral portion of said split ring to prevent outward movement of said ring and retain said split ring in mounted position.

2. The mounting structure of claim 1, wherein said ring retainer means comprises a cap member having a centrally disposed opening therethrough and a downturned flange extending downwardly alongside the outer peripheral edge of said split ring.

3. The mounting structure of claim 2 additionally including a hollow stem packing retainer threadedly mounted in said sleeve around said stem extending from the outer end of said sleeve and overlying an inner portion of said cap member thereby holding said cap in rigid mounted position on said sleeve.

4. The mounting structure of claim 3, wherein:

a. said sleeve and said collar are cross-sectionally round, and b. said means to prevent rotation has a key member mounted in juxtapositional relation with said collar and said sleeve and between said collar and said sleeve.

5. A means for mounting a fluid actuator on a gate valve having a bonnet with a valve stem extending therethrough comprising:

a. a sleeve extending from the bonnet of a gate valve around a portion of the valve stem, said bonnet having a means to rigidly support said sleeve, b. a collar mounted through a control opening of an actuator cylinder housing and mounted around said sleeve, said bonnet having means to rigidly support said actuator cylinder on said sleeve, said sleeve having an outer end portion thereof extending substantially beyond said collar inside said cylindrical housing, c. means mounted on said sleeve and on said collar to prevent rotation of said cylinder housing relative to said bonnet, d. a groove around the exterior of said sleeve outer end portion, e. a split ring mounted in said groove, said split ring being positioned adjacent to the end of said collar, f. a generally cap-shaped member having a central opening therethrough mounted on said sleeve and having a downturned flange extending downwardly alongside the outer periphery of said split ring to retain the split ring against outward movement, and g. a hollow stem packing retainer threaded within said sleeve around the valve stem and having an upper outer flange overlying the cap-shaped member to hold the cap-shaped member in retained position on said sleeve.

6. The mounting structure of claim 5, wherein:

a. said sleeve and said collar are cross-sectionally round, and b. said means to prevent rotation has a key member mounted in juxtapositional relation with said collar and said sleeve and between said collar and said sleeve.

* * * * *